May 18, 1948.  C. R. DOWNS  2,441,873
PROCESS FOR RECOVERING MOLTEN PHTHALIC ANHYDRIDE
Filed June 3, 1944  2 Sheets-Sheet 1

INVENTOR
Charles R. Downs
BY
ATTORNEYS

Patented May 18, 1948

2,441,873

UNITED STATES PATENT OFFICE 2,441,873

PROCESS FOR RECOVERING MOLTEN PHTHALIC ANHYDRIDE

Charles R. Downs, Old Greenwich, Conn.

Application June 3, 1944, Serial No. 538,685

6 Claims. (Cl. 260—342.5)

This invention relates to the recovery of phthalic anhydride after condensation from vapor phase.

In the production of phthalic anhydride by the catalytic oxidation of aromatic hydrocarbons such as naphthalene, o-xylol, phenanthrene, etc., in the vapor phase, the mixture of fixed gases, water vapor and phthalic anhydride vapor and other partial oxidation products, discharged from the catalyst converters, is commonly cooled to the dew point of the phthalic anhydride vapors, and then condensed on cool surfaces, commonly in large box-like chambers frequently called "hay barns." As the dew point of this vapor-gas mixture is usually below the melting point of phthalic anhydride, the separation of the phthalic anhydride from the gases ordinarily takes place by crystallization of the phthalic anhydride in long thread-like crystals, which festoon the condensing surfaces and the walls of the chambers, and seriously impair the heat-transfer rate at said surfaces.

If allowed to accumulate on the floors of the compartments, these crystals form a deep bed, similar in appearance to hay. They may be drawn out periodically by hand rakes inserted through doors in the fronts of the compartments to buggies, or mechanical conveyors may form the bottoms of the compartments the purpose of which is to remove the "hay" continuously as produced. Such operations, however, are attended by serious health hazards. The vapors of the phthalic and maleic anhydrides and the quinones are very irritating to mucous membranes. The gases also contain carbon monoxide. The methods of operation in common use result in egress of the vapors and gases to the working space, through the opening of the doors, or leakage around conveyors. This is dangerous to the health of the operators. Expensive ventilating equipment is therefore required. Neither method for the removal of the products from the compartments is satisfactory, and with any such method the difficulty remains of melting such a fluffy, heat-insulating material.

When phthalic anhydride vapors condense out from the accompanying gases, they crystallize not only in the form of "hay," but also to some extent as a hard adherent scale on the walls of the compartments. This layer of scale also reduces the rate of heat transfer through the walls. Various proposals have been made to knock or scrape such scale from the walls by mechanical means, but the wall areas are large, and such methods are unsatisfactory. Frequent cleaning of the walls is required, by actually sending men into the compartments with hand scrapers, again taking proper precautions against health hazards.

The methods heretofore used for unloading the condensing chambers are excessively costly from a labor standpoint, and, moreover, they frequently interfere with production.

One object of the present invention, therefore, is to eliminate the health hazards heretofore involved in phthalic anhydride production.

Another object is to reduce operating costs.

Another object is to provide a simple method of removing the product from the condensing chambers which avoids unsatisfactory and costly mechanical equipment.

A further object is to reduce the size of the condensing chambers by keeping the heat-removing surfaces in an improved heat transfer condition.

In this specification and the accompanying drawings, I have shown and described a preferred embodiment of my invention and various modifications thereof; it is to be understood that these are not intended to be exhaustive nor limiting of the invention, but on the contrary are given for purposes of illustration in order that others skilled in the art may fully understand the invention and the principles thereof and the manner of applying it in practical use so that they may modify and adapt it in various forms, each as may be best suited to the conditions of a particular use.

The invention will be further described by reference to the accompanying drawing in which Fig. 1 is a diagrammatic view or flow sheet illustrating the method of my invention and apparatus suitable for the practice thereof;

The gases containing the vapors of phthalic anhydride, with other by-products, if present, are cooled somewhat below the dew point of the phthalic anhydride by passing them through a chamber which is cooled to the desired temperature by any suitable means. Although "phthalic anhydride" is referred to in this specification and the accompanying claims, it will be understood that the invention will be used most often in connection with the impure solid such as collects in the "hay barns" of a phthalic anhydride plant. The term is, therefore, to be construed to cover such impure product as well as the pure chemical, phthalic anhydride.

When the desired amount of phthalic anhydride in the form of "hay-like" crystals has accumulated, or when objectionable amounts of scale have formed on the cooling surfaces of a chamber, the gaseous products from the catalytic converter are diverted from the chamber to another means of disposal, such as a second chamber. Liquefied phthalic anhydride from a supply at a temperature considerably above its melting point (with or without impurities as the case may be, but in any case above the melting point of the crude phthalic anhydride to be washed down) is then discharged into the chamber so that it will come into contact with the phthalic anhydride in the chamber, and wash it along with the molten stream. The total molten phthalic anhydride is then withdrawn to the supply source, or any other suitable point of disposal, or a part or all of it may be re-heated and recirculated back to the chamber until the desired amount of phthalic anhydride has been removed therefrom. The liquefied phthalic anhydride used for purging the chamber may be pumped through spray nozzles directed toward the surfaces covered with the crystallized phthalic, and the melted contents may be drained, or pumped, from the bottom of the chamber. The temperature of the liquefied phthalic anhydride pumped into the chamber should be such that it will melt the phthalic anhydride and incidentally heat the chamber without itself solidifying, and the pumping rate must be adjusted to supply sufficient heat to melt the anhydride within a predetermined length of time. Suitable temperatures and pumping rates will depend upon the quantity of condensed anhydride to be melted, and the size of the chamber. Heating means associated with the chamber as described below, will also affect these factors.

By my method, the chamber may be made vapor- and gas-tight, and there is no chance for egress of vapors or gases through the opening of discharge doors, or leakage around conveyors. The cost of pumping is negligible. No foreign matter is introduced as a contaminant. The time required for emptying the chamber may be very short.

After the chamber has been discharged and cleaned by melting its contents according to my process, the chamber may be cooled, if desired, by any suitable means, and it is then ready to perform again as a condenser for phthalic anhydride.

Figures 1, 2:
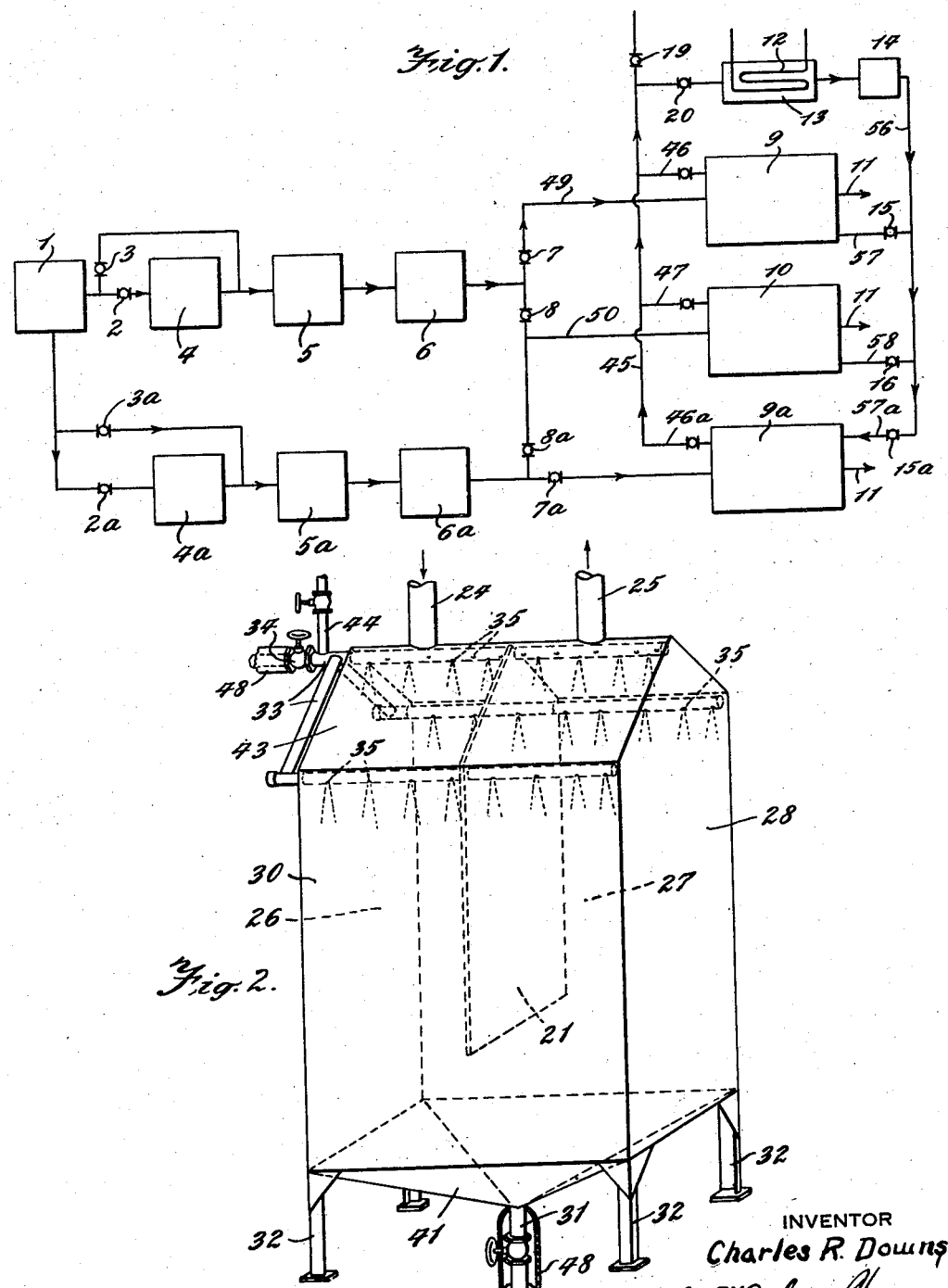
Fig. 2 is a diagrammatic perspective view of a condensing and melting chamber.

In order to further illustrate my invention, attention is directed to Figure 1.

Numeral 1 indicates a compressor for supplying air for the oxidation of the naphthalene raw material. A part of this air heated to a suitable temperature is supplied to vaporizer 4, at a suitable rate, regulated by valve 2. Naphthalene raw material is also supplied to the vaporizer at a suitable temperature and rate. Valve 3 is used to mix secondary air in proper proportion and temperature with the air-naphthalene mixture leaving vaporizer 4. Numeral 5 indicates a catalytic converter of any suitable form, e. g., such as is described in U. S. Patent 1,604,739; and 6 is a heat-exchanger to cool the products of the catalytic reaction to a desired temperature to relieve the heat-transfer load on the less efficient cooling surfaces of the "hay barn" condensing chambers 9 and 10. These chambers 9 and 10 are connected for alternate use by means of the valves 7 and 8 and lines 49 and 50. The gases and vapors leave the chambers 9 and 10 by the duct 11 to any suitable disposal or recovery apparatus, which may be water-scrubbing towers, etc., not shown.

The above described parts of equipment are commonly used for making phthalic anhydride. In addition to this conventional (or any other suitable) system for making and condensing the phthalic anhydride, I provide accessory equipment for carrying out my process, as follows: 13 represents a heated storage tank, or other vessel, for holding a body of molten anhydride suitably above its melting point. A steam coil for heating the anhydride is shown at 12. 14 is a pump for circulating the molten anhydride, and line 56 having branches 57 and 58 provided with valves 15 and 16 are provided for discharging the anhydride into chambers 9 or 10. Manifold 45 and branch connections 46 and 47 provide for discharge of molten anhydride from the respective chambers, and valves 19 and 20 permit the bleeding off of the melted anhydride for further refining and disposition and the return to the vessel 13 of desired proportions.

A parallel train of equipment is represented in the drawings and identified by the same reference numerals with addition of the letter "a." The number of such interconnected parallel trains will be determined by engineering and operating considerations, and this second train, therefore, is representative of any desired number. Vessel 13, pump 14, and accessory pipe lines may be used for serving all or any group of such trains; and likewise, condensing chamber 10 may serve as a diverting condenser for a considerable number of chambers 9, 9a, etc., with suitable connecting piping arrangements so that it can be substituted for a chamber 9 in any train while the chamber 9 is being cleaned of condensate as hereinbelow described.

The gases and anhydride vapors, for example from converter 5a, may be led into chamber 9a, while the gases and vapors from converter 5 are being diverted to chamber 10, and chamber 9 is being purged and cooled. Then the gases and vapors from converter 5 may be passed into chamber 9, and the gases and vapors from converter 5a led into chamber 10, while chamber 9a is being purged and cooled for reuse as a condensing chamber. The purging and cooling of chambers 9 and 9a requires such a short time by my process, that 10 may serve as a diverting chamber for these and other condensing chambers, and still leave time to purge chamber 10 of the small amounts of anhydride collected therein per cycle. Or a series of condensing chambers, such as 9 and 10 can be used in rotation, with one being purged while others are in use, and each after purging being connected in place of the one which has been longest in use, the latter being then cut out for purging.

The design of the condensing chambers, 9, 10, and 9a, may be varied as to details of construction without departing from the scope of the invention. Figure 2 represents a perspective view of such a condensing chamber which, for example, consists of four straight walls, 28 and 30, and a sloping floor 41, and roof 43. The interior of the chamber is divided into two compartments by the vertical baffle 21, which extends from the roof of the chamber down to a convenient distance from the floor 41. The baffle 21 in the simple form shown may be a single sheet of metal or other material. The floor 41 may be pyramidal in contour providing a hopper, so that liquid material can drain to the valved outlet pipe 31. The chamber is shown as supported by legs 32.

The walls 28 and 30, and roof 43 may be exposed to the surrounding atmosphere for heat removal, or other cooling means may be provided.

The gases and vapors, such as phthalic anhydride vapors, enter through duct 24, pass downwardly through compartment 26, and then upward through compartment 27 to the exit duct 25, from which they may pass to other chambers or scrubbing towers.

Pipes 33 valved at 34 and provided with spray nozzles 35 serve to introduce superheated molten phthalic anhydride into the chamber and direct it against the walls and roof and chamber contents for melting solid anhydride previously condensed in the form of "hay" hanging on the walls, or deposited on the floor, or in the form of scale which has formed on previously cooled walls, roof or baffle. The hot, molten, phthalic anhydride introduced through 33, plus the anhydride melted in the chamber is discharged through pipe 31, a part returning for storage and re-heating at 13 and a part being drawn off through valve 19.

Figure 3:
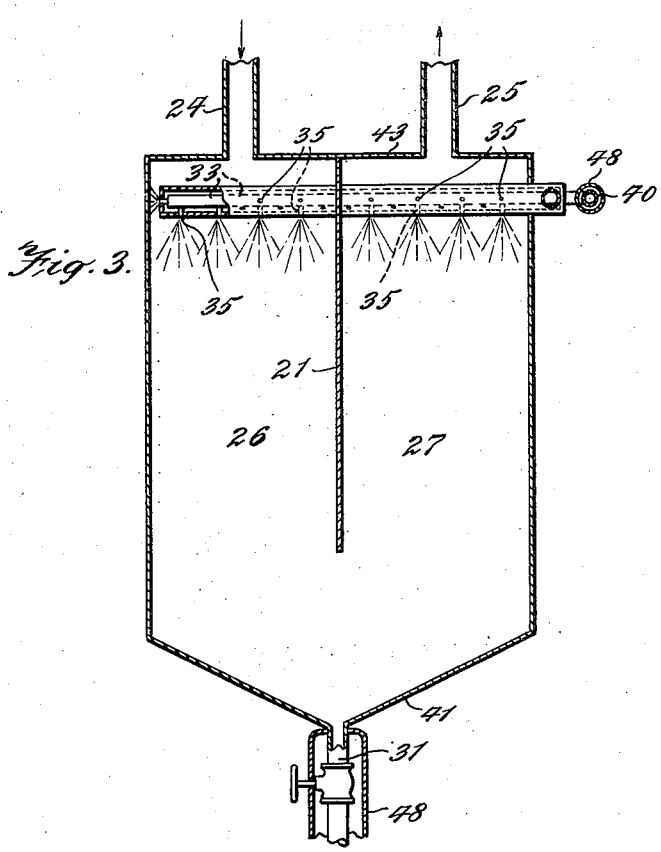
Fig. 3 is a diagrammatic view in vertical section of a modified form of condensing and melting chamber taken on line 3—3 of Figure 4.
Figure 4:
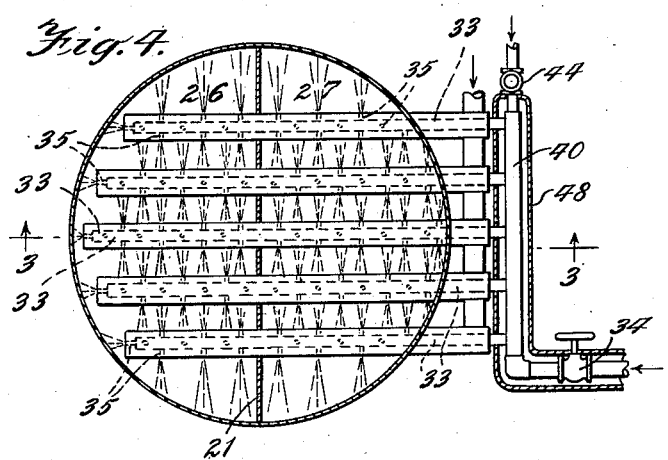
Figure 4 is a plan view of the chamber similar to that shown in Figure 3.

As illustrated by Figures 3 and 4, the condensation chamber may have any of a variety of forms and construction. The modifications include a plurality of spray pipes 33 provided with nozzles 35 and manifolded in a header 40 provided with valve 34. The baffle 21 is a solid sheet suspended from the roof 43. As shown, it is preferable to provide a series of pipes 33 in the form of a grid or coils or concentric rings connected through a header 40, so that the sprays formed by the nozzles will wash the walls of the compartments and fall directly down into the "hay" collected on the hopper-like bottom 41.

A pump 14 and pipe line 56 for delivering molten phthalic anhydride are connected to header 40. This pipe 56 and pump 14 are connected to a source of molten phthalic anhydride 13 maintained by suitable means at a predetermined temperature as described above in connection with Fig. 1. A valved outlet pipe is shown at 31 which may be connected to the return piping 45, 46 and 47, as shown in Fig. 1. The pipe line 56, the return piping 45, 46 and 47, the header 40, the pump 14 and all intermediate connections are preferably steam jacketed and/or insulated, as shown at 48, to avoid solidification between purging operations or to melt out any solid which may have formed. Valved connections 44 are provided to admit an inert compressed gas or other purging fluid, from a source not shown, after the valve 34 has been closed; and thereby to drive out any remaining phthalic anhydride from the spray pipes and connections and the nozzles 35, and thus to avoid clogging of these parts by solidification of the phthalic anhydride. All parts of the apparatus are completely sealed from the atmosphere and it is unnecessary to use any mechanical removal devices which might develop leaks. Health hazard is thus avoided.

In using the chambers shown in Figs. 2, 3, and 4, according to the process of the invention, while the gases and vapors are being introduced through duct 24, the valves 34 and the line 44 are shut off. During that time, heat is dissipated through the walls by ordinary atmospheric convection and radiation, or if desired, by forced air circulation or sprays on the exterior walls or jackets or cooling coils on or built into walls and/or baffles. The gases pass at a relatively low velocity down through compartment 26 and up through 27. The phthalic anhydride collects on the roof and walls and baffle of the chamber, and eventually drops of its own weight into hopper 41 where it accumulates as a "hay-like" bed. It also forms as a solid, adherent scale on the cooling surfaces. Thus, gradually the rate of heat removal from the gases is reduced.

The gases containing a reduced amount of phthalic anhydride are discharged through duct 25 to other chambers or to scrubbers.

When the bed in the hopper 41, or the deposit on the cooling surfaces has built up to a predetermined degree, the inlet and exit ducts 24 and 25 are closed, and the gases and vapors diverted to other equipment as described above. Melted anhydride is then discharged through nozzles 35 at a temperature sufficiently high to melt the bed in the hopper, and the scale on the walls, and permit the molten anhydride to be withdrawn through 31. The melting of the anhydride on the previously cooled surfaces may at first be delayed by the low temperature of these surfaces. As the flow of molten anhydride continues, however, sufficient heating occurs to cause fusion of all condensed phthalic anhydride. After the chamber has been purged of its contents, the sprays 35 are shut off at 34 and blown out by opening the compressed gas connection 44 for a short time, the outlet pipe 31 is then closed, the chamber is cooled, and it is then ready for performing its condensing function by opening ducts 24 and 25.

The temperature of the molten phthalic anhydride which is circulated through the spray pipes should be sufficiently above the melting point to supply the heat of fusion of the phthalic anhydride condensed in the chamber but also any heat losses during the purging operation and at the end of the purging the temperature of the condensing surface should be sufficiently above the melting point of the phthalic anhydride so that the molten material can drain effectively from those surfaces and leave a minimum of the phthalic anhydride to crystallize upon further cooling. If heat is supplied from other sources the temperature and/or the volume of the recirculated phthalic anhydride can be correspondingly reduced.

The washing down of the walls by the sprays 35 is not only a great labor- and time-saver, thereby reducing the amount of condensing equipment required for uninterrupted operation of the catalytic converters, but the surfaces can be kept clean of anhydride, and in a good heat transfer condition which cannot be duplicated by hand or mechanical scraping. For this purpose the arrangement of spray pipes 33 and nozzles 35 as shown in Figs. 3 and 4 is desirable. Furthermore, it is well known that a bed of phthalic anhydride is difficult to melt, and requires a long time if it merely rests upon a heating surface such as a conventional jacketed melter. By my process, the melting takes place very rapidly, because it is washed by hot, liquefied anhydride, raining down onto, and through it. The rapid melting of the anhydride in the condensing chamber eliminates the necessity for a separate melter into which the solid anhydride is commonly charged.

However, if the anhydride is condensed according to conventional practice and charged into an externally heated melter, the generic principle of my invention may be applied in melting the condensed anhydride by flowing hot liquid anhydride over the crystals in the melter, e. g. a melter equipped with sprays through which hot melted anhydride is introduced to meet the crystals therein.

Cooling jackets, or coils inside or outside of the chamber, may be used to increase the heat exchange rate and thus further to increase the capacity of the condensing chamber. The provision and arrangement of such means are matters of engineering well understood in the art, but the use of cooling coils inside a phthalic anhydride condenser is made feasible by the present invention, since without it the deposition of scale on the cooled surfaces would be rapid and difficult to remove by scraping. Because of the peculiarities of phthalic anhydride, however, I prefer not to place closely spaced cooling coils in a downward or horizontal flow of vapors, e. g. in compartment 26, because they would tend to prevent the "hay-like" anhydride from falling into hopper 41, whereas in compartment 27, these "hay-like" crystals would form mostly on the lower side of the coils and fall off without forming a detrimental bed thickness on the top side of the coils.

I claim:

1. The method of recovering liquid phthalic anhydride which comprises passing gas comprising crude phthalic anhydride vapors through a condensing chamber wherein phthalic anhydride crystals will be formed, stopping said flow of gas, impinging onto a mass of such crystals within said chamber molten phthalic anhydride heated to a temperature sufficiently above its melting point to supply heat of fusion to said crystals, draining molten phthalic anhydride from said space, heating a portion of the molten phthalic anhydride thus withdrawn from said chamber to a temperature substantially above that at which it is withdrawn and spraying the phthalic anhydride thus heated back onto the remaining phthalic anhydride crystals to melt them.

2. In the manufacture of phthalic anhydride the process which comprises passing a crude phthalic anhydride vapor mixture through a condensing chamber and condensing the phthalic anhydride to solid form in that chamber, introducing into said chamber molten phthalic anhydride at a temperature sufficiently above its melting point to supply heat of fusion to said solid phthalic anhydride, contacting said molten anhydride with solid anhydride condensed in said chamber and thereby melting it, and withdrawing from said chamber anhydride thus melted together with said introduced molten anhydride.

3. In the manufacture of phthalic anhydride by the catalytic partial oxidation of aromatic hydrocarbon in the vapor phase the process which comprises passing the products of oxidation through a condensing chamber substantially closed to contact with the atmosphere and condensing the phthalic anhydride to solid form in that chamber, closing said chamber against flow of gases, introducing into said chamber molten phthalic anhydride at a temperature sufficiently above its melting point to supply heat of fusion to said solid phthalic anhydride, contacting said molten anhydride with solid anhydride condensed in said chamber and thereby melting it, and withdrawing from said chamber anhydride thus melted together with said introduced molten anhydride while maintaining said chamber substantially closed to contact with the atmosphere.

4. The process of removing phthalic anhydride from a chamber containing said anhydride in solid form said chamber being substantially closed to the atmosphere which comprises introducing into said chamber molten phthalic anhydride at a temperature sufficiently above its melting point to supply heat of fusion to said solid anhydride, contacting said heated molten phthalic anhydride with solid phthalic anhydride in said chamber and thereby melting it and withdrawing from said chamber phthalic anhydride thus melted together with said introduced molten phthalic anhydride.

5. In the manufacture of phthalic anhydride by the partial oxidation of aromatic hydrocarbon in the vapor phase the cyclical process which comprises passing the products of oxidation through a first condensing chamber, cooling said products therein and condensing the phthalic anhydride to solid form in that chamber, diverting the products of oxidation to a second chamber, and condensing the phthalic anhydride to solid form in that second chamber, introducing into the first chamber molten phthalic anhydride at a temperature sufficiently above its melting point to supply heat of fusion to said solid phthalic anhydride, contacting solid phthalic anhydride condensed in said first chamber with said hot molten phthalic anhydride and thereby melting it, withdrawing from said first chamber phthalic anhydride thus melted therein together with said introduced molten phthalic anhydride, and again passing the products of said oxidation through said first chamber.

6. The method of recovering liquid phthalic anhydride from mixed gases including phthalic anhydride vapor which comprises passing the vapors over condensing surfaces cooled to a temperature below the melting point of the phthalic anhydride within a continued space to deposit solid phthalic anhydride, in said space, discontinuing said flow and substantially sealing said space against escape of phthalic anhydride vapors and passing liquid phthalic anhydride at a temperature sufficiently above its melting point to supply heat of fusion to said solid phthalic anhydride into said space and over the surfaces of said solid phthalic anhydride to melt and substantially wash away the solid anhydride.

CHARLES R. DOWNS.

REFERENCES CITED

The following references are of record in the file of this patent:

UNITED STATES PATENTS

| Number | Name | Date |
|---|---|---|
| 277,012 | Dinkel | May 8, 1883 |
| 910,982 | Allen | Jan. 26, 1909 |
| 1,336,182 | Andrews | Apr. 6, 1920 |
| 1,369,729 | Danckwardt | Feb. 22, 1921 |
| 1,464,844 | Downs | Aug. 14, 1923 |
| 1,563,718 | Brown | Dec. 1, 1925 |
| 1,837,869 | Jewett et al. | Dec. 22, 1931 |
| 1,891,754 | Daniels et al. | Dec. 20, 1932 |
| 1,891,891 | Luft | Dec. 20, 1932 |
| 2,019,112 | Beekhuis | Oct. 29, 1925 |
| 2,057,100 | Jesperson | Oct. 13, 1936 |
| 2,064,468 | Foster | Dec. 15, 1936 |
| 2,067,019 | Riegler | Jan. 5, 1937 |
| 2,076,033 | Kniskern | Apr. 6, 1937 |
| 2,112,024 | Jarl et al. | Mar. 22, 1938 |
| 2,160,177 | Shuman | May 30, 1939 |
| 2,215,968 | Livingston | Sept. 24, 1940 |
| 2,219,333 | Rogers | Oct. 29, 1940 |
| 2,247,910 | Douglass et al. | July 1, 1941 |
| 2,302,888 | Porter | Nov. 24, 1942 |

FOREIGN PATENTS

| Number | Country | Date |
|---|---|---|
| 622,727 | Germany | Dec. 5, 1935 |